United States Patent Office 2,729,643
Patented Jan. 3, 1956

2,729,643

1,3-DISUBSTITUTED AND 1,3,8-TRISUBSTITUTED-7-CARBOXAMIDO XANTHINES

Willy Stoll and Erich Schmid, Basel, Switzerland, assignors to the Swiss firm J. R. Geigy A.-G., Basel, Switzerland No Drawing. Application January 10, 1955,
Serial No. 480,991

Claims priority, application Switzerland January 27, 1954

6 Claims. (Cl. 260—256)

The present invention is concerned with new derivatives of 1.3-disubstituted and 1.3.8-trisubstituted xanthines as well as with processes for the production thereof.

It has been found that 1.3-disubstituted and 1.3.8-trisubstituted 7-carbamoyl xanthines and thioxanthines of the general formula:

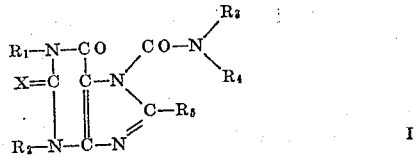

wherein $R_1$, $R_2$ and $R_3$ represent aliphatic hydrocarbon radicals,
$R_4$ represents hydrogen or an aliphatic hydrocarbon radical and $R_3$ and $R_4$ together with the nitrogen atom may also represent an alkylene imino radical with 5 to 6 ring members or the morpholino radical,
$R_5$ represents hydrogen or an aliphatic hydrocarbon radical and
X represents O or S, have an increased diuretic activity in comparison with theophyllin and derivatives thereof such as, e. g. 7-($\beta$-hydroxyethyl)- and 7-($\beta.\gamma$ - dihydroxy-propyl)-theophyllin while at the same time having good tolerability and are suitable as diuretics for administration per os.

The new compounds can be produced by two related processes from 1.3-disubstituted xanthines, by which in the following are always also to be understood the corresponding 1.3.8-trisubstituted xanthines and the corresponding 2-thioxanthines of the general formula:

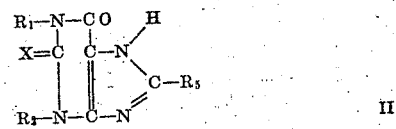

wherein $R_1$, $R_2$, $R_5$ and X have the meanings given above. These processes can each be again subdivided into two modifications, the use of which however depends on whether in the end product, $R_4$ represents hydrogen or an aliphatic hydrocarbon radical, or

represents an alkylenimino or the morpholino radical.

According to the first general process, reactive carbamic acid derivatives which, at the nitrogen atom, contain the radicals $R_3$ and $R_4$ or $R_3$ alone, namely carbamic acid halides or isocyanates, which latter can be termed inner anhydrides of carbamic acids, are reacted with metal salts of 1.3-disubstituted xanthines of the general Formula II, or with the 1.3-disubstituted xanthines themselves respectively. According to the second general process, reactive carbonic acid derivatives such as chloroformic acid esters or phosgene are reacted with metal salts of 1.3-disubstituted xanthines. The 7-carbonic acid derivatives of 1.3-disubstituted xanthines so obtained are then reacted with amines of the general formula:

The modes of performing both these processes are more particularly described in the following.

Metal salts of 1.3-disubstituted xanthines of the general Formula II can be reacted with carbamic acid halides of the general formula:

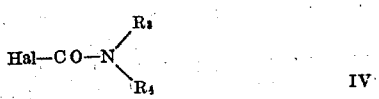

wherein Hal represents chlorine or bromine. The alkali salts of 1.3-disubstituted xanthines can be obtained, for example by evaporating solutions of 1.3-disubstituted xanthines in aqueous or alcoholic alkalies or by reacting the xanthines in organic solvents with substances giving off alkali such as sodium amide, sodium hydride or lithium amide. The alkaline earth metal salts obtained from alkaline earth hydroxides and xanthines can be used, for example, as further metal salts of the xanthines.

It is of advantage to perform the reaction of the alkali compounds of 1.3-disubstituted xanthines with the carbamic acid halides in suitable organic solvents such as e. g. ethyl acetate, benzene or toluene. The reaction can also be performed however in the absence of solvents or diluents.

This modification of the first process is very suitable for the production of compounds in which $R_4$ is different from hydrogen.

The second modification of the first process consists in reacting a 1.3-disubstituted xanthine of the general Formula II with an isocyanic acid compound of the general formula:

$$O=C=N-R_3 \qquad V$$

wherein $R_3$ has the meaning given above, the reaction being performed while warming. This is a preferred method for the production of 7-monoalkylcarbamoyl or 7-monoalkenyl-carbamoyl derivatives of 1.3-disubstituted xanthines.

In addition, the compounds according to the general Formula I given above can also be produced by converting 1.3-disubstituted xanthines of the general Formula II first into compounds of the general formula:

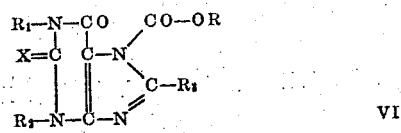

wherein R represents the radical of a hydroxy compound, in particular a methyl, ethyl or phenyl radical and X, $R_1$, $R_2$ and $R_5$ have the meanings given above, by reacting a metal salt thereof with a haloformic acid ester and then reacting these intermediate products with amines of the general Formula III.

In addition, in a further two step modification of the second process, metal salts of 1.3-disubstituted xanthines of the general Formula II can be converted with phosgene into 7-chlorocarbonyl compounds (7-chloroformyl compounds) of the general formula:

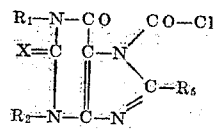

wherein X, $R_1$, $R_2$ and $R_5$ have the meanings given above, and these can be reacted with amines of the general Formula III.

1.3-dimethyl xanthine (theophyllin), 1-methyl-3-ethyl xanthine, 1-ethyl-3-methyl xanthine, 1.3-diethyl xanthine, 1-methyl-3-n-propyl xanthine, 1-ethyl-3-n-propyl-xanthine, 1-ethyl-3-isopropyl xanthine, 1.3-di-n-propyl xanthine, 1-methyl-3-n-butyl xanthine, 1-ethyl-3-n-butyl xanthine, 1.3-di-n-butyl xanthine, 1.3-di-isobutyl xanthine, 1.3-di-n-amyl xanthine, 1.3-di-n-heptyl xanthine, 1.3-di-(β-ethyl-hexyl)-xanthine, 1-ethyl-3-allyl xanthine, 1-allyl-3-ethyl xanthine, 1.3-diallyl xanthine, 1.3.8-trimethyl xanthine, 1.3-dimethyl-8-ethyl xanthine, 1.3-dimethyl-8-n-propyl xanthine, 1,3-dimethyl-8-isopropyl xanthine, 1.3-dimethyl-8-n-butyl xanthine, 1.3-dimethyl-8-isobutyl xanthine, 1,3-dimethyl-8-sec. butyl xanthine, 1.3-dimethyl-8-allyl xanthine, 1.3-diethyl-8-methyl xanthine, 1.3.8-triethyl xanthine, 1.3-diethyl-8-isopropyl xanthine, 1.3-diethyl-8-n-propyl xanthine, 1.3-diethyl-8-n-butyl xanthine, 1.3-diethyl-8-isobutyl xanthine, 1.3-diethyl-8-sec. butyl xanthine, 1.3-diethyl-8-allyl xanthine, 1.3-di-n-propyl-8-methyl xanthine, 1.3-di-n-propyl-8-ethyl xanthine, 1.3.8-tri-n-propyl xanthine, 1.3-di-n-propyl-8-isopropyl xanthine, 1.3-di-n-propyl-8-n-butyl xanthine, 1.3-di-n-propyl-8-isobutyl xanthine, 1.3-di-n-propyl-8-sec. butyl xanthine, 1.3-di-n-propyl-8-allyl xanthine, 1.3-diallyl-8-methyl xanthine, 1.3-diallyl-8-ethyl xanthine, 1.3-diallyl-8-n-propyl xanthine, 1.3-diallyl-8-isopropyl xanthine, 1.3-diallyl-8-n-butyl xanthine, 1.3-diallyl-8-isobutyl xanthine, 1.3-diallyl-8-sec. butyl xanthine, 1.3-di-n-butyl-8-methyl xanthine, 1.3-di-n-butyl-8-ethyl xanthine, 1.3-di-n-butyl-8-n-propyl xanthine, 1.3.8-tri-n-butyl xanthine, 1.3-isobutyl-8-methyl xanthine, 1.3-di-iso-butyl-8-ethyl xanthine, 1.3-di-isobutyl-8-n-propyl xanthine, 1.3-di-isobutyl-8-isopropyl xanthine, 1.3.8-tri-isobutyl xanthine, 1.3-dimethyl-2-thioxanthine, 1-methyl-3-ethyl-2-thioxanthine, 1.3-diethyl-2-thioxanthine, 1.3-di-n-propyl-2-thioxanthine, 1.3-diethyl-8-methyl-2-thioxanthine, 1.3.8-triethyl-2-thioxanthine and 1.3-diethyl-8-n-propyl-2-thioxanthine can be named for example as 1.3-disubstituted xanthines or 1.3-disubstituted thioxanthines of the general Formula II.

As carbamic acid halides of the general Formula IV, in particular the disubstituted carbamic acid chlorides which are easily produced from secondary amines and phosgene such as, e. g. dimethyl, methyl-ethyl, diethyl, di-n-propyl, di-n-butyl, di-isobutyl, methyl-n-butyl, and diallyl carbamic acid chloride and pyrrolidino, piperidino and morpholino carbonyl chloride can be used.

Suitable aliphatic isocyanates of the general Formula V for use in the second modification of the first process named are, e. g. methyl, ethyl, n-propyl, isopropyl, n-butyl, isobutyl, allyl and methallyl isocyanate.

The primary amines corresponding to the isocyanates given above or the secondary amines corresponding to the carbamic acid chlorides given above are suitable as amines of the general Formula III for use as starting materials for the two modifications of the second process.

The following examples illustrate further the invention. Where not otherwise stated, parts are given as parts by weight. The temperatures are in degrees centigrade.

Example 1

26.4 parts of 1.3-di-isobutyl xanthine are dissolved while warming in 100 parts by volume of normal caustic soda lye. The solution is evaporated to dryness in the vacuum, the residue is pulverised and suspended in 100 parts of ethyl acetate. 10.8 parts of dimethylcarbamoyl chloride are then added dropwise at room temperature whereupon the whole is boiled for 3 hours under reflux, diluted with another 400 parts of ethyl acetate, filtered hot under suction, slightly concentrated and cooled. The greater part of 1.3-di-isobutyl-7-dimethylcarbamoyl xanthine separates out. It is recrystallised from ethyl acetate and melts at 148–149°.

Example 2

20.8 parts of 1.3-diethyl xanthine are dissolved hot in 400 parts by volume of toluene and 2.4 parts of sodium hydride or, while passing a dry stream of nitrogen through, 3.9 parts of sodium amide are added in portions. On completion of the reaction the reaction mixture is cooled, 8.0 parts of phosgene in 100 parts of toluene are added and the whole is stirred for 24 hours at 0–10°. 300 parts of toluene are then distilled off (in order to remove the excess phosgene), the residue is cooled, 8 parts of diethylamine are added and the temperature is kept at 60° until the reaction is complete. The reaction product is cooled, filtered and concentrated whereupon 1.3-diethyl-7-diethylcarbamoyl xanthine crystallises out. After recrystallisation from ether, it melts at 89–91.5°; it boils at 166° under 0.2 mm. pressure.

Example 3

28 parts of 1,3-diethyl-7-carbethoxy xanthine (M. P. 94–96.5°) are dissolved warm in 200 parts of abs. alcohol and 300 parts of cold saturated alcoholic dimethyl amine are added. The reaction mixture is allowed to stand for some days at room temperature and then the liquid containing the raw 1.3-diethyl-7-dimethyl carbamoyl xanthine which has formed is distilled. It boils at 182° under 0.45 mm. pressure. After recrystallisation from acetone, it melts at 110.5–113°.

Example 4

20.8 parts of 1.3-diethyl xanthine with 100 parts of ethyl isocyanate are heated for 5 hours in the autoclave at 100–110° and then the excess ethyl isocyanate is distilled off. The residue is recrystallised from ether. The 1.3-diethyl-7-ethylcarbamoyl xanthine obtained in this way in good yield melts at 112–113°.

Example 5

22.4 parts of 1.3-diethyl-2-thioxanthine are dissolved in 300 parts of abs. alcohol and a solution of 2.3 parts of sodium in 100 parts of abs. alcohol is poured in. The alcohol is then distilled off in the vacuum. The pulverised residue is suspended in 200 parts of ethyl acetate, 10.7 parts of dimethyl carbamoyl chloride are added dropwise at room temperature and the whole is boiled for 3 hours under reflux. Finally, a further 300 parts of ethyl acetate are added, the temperature is brought quickly to the boil and the reaction mixture is filtered hot under suction. On cooling, 1.3-diethyl-2-thio-7-dimethylcarbamoyl xanthine separates out of the filtrate in crystalline form.

After recrystallisation from alcohol, it melts at 177–178.5°.

Example 6

25 parts of 1.3-diethyl-8-n-propyl xanthine and 50 parts of ethyl isocyanate are heated to 100° for 3 hours in a sealed tube, the excess ethyl isocyanate is then evaporated off and the residue is taken up in ethyl acetate. After recrystallisation several times from ethyl acetate, 1.3-diethyl-8-n-propyl-7-ethylcarbamoyl xanthine melts at 85–87°.

Example 7

30 parts of the sodium salt of 1.3-di-n-butyl-8-methyl xanthine, prepared according to Example 1, are suspended in 140 parts of dry isoamyl acetate and 10.7 parts of dimethylcarbamoyl chloride are added dropwise in the cold. The reaction mixture is then boiled for 1 hour under reflux, separated from the precipitated sodium chloride by filtration under suction, and the solvent is evaporated off.

By recrystallising the residue from ether, 1.3-di-n-butyl-8-methyl-7-dimethylcarbamoyl xanthine is obtained. It melts at 92.5–94°.

The following compounds for example can be produced in a manner analogous to that described in the above examples:

(1) 1.3-dimethyl-7-dimethylcarbamoyl xanthine, M. P. 167–171°
(2) 1.3-dimethyl-7-diethylcarbamoyl xanthine, M. P. 131–133°
(3) 1.3-diethyl-7-methylcarbamoyl xanthine, M. P. 139.5–142°
(4) 1.3-diethyl-7-di-n-propylcarbamoyl xanthine, M. P. 101–102.5°
(5) 1.3-diethyl-7-piperidinocarbonyl xanthine, M. P. 98–100.5°
(6) 1.3-diethyl-7-morpholinocarbonyl xanthine, M. P. 132–133.5°
(7) 1.3-diethyl-7-pyrrolidinocarbonyl xanthine, M. P. 133–135°
(8) 1.3-diethyl-7-diethylcarbamoyl-2-thioxanthine, M. P. 88–90.5°
(9) 1.3-diallyl-7-dimethylcarbamoyl xanthine, M. P. 104–105.5°
(10) 1.3-diallyl-7-diethylcarbamoyl xanthine, M. P. 62–64°
(11) 1.3-di-n-propyl-7-dimethylcarbamoyl xanthine, M. P. 111.5–113°
(12) 1.3-di-n-propyl-7-diethylcarbamoyl xanthine, M. P. 53–56°
(13) 1.3-di-n-propyl-7-ethylcarbamoyl xanthine, M. P. 110.5–102°
(14) 1.3-di-isobutyl-7-diethylcarbamoyl xanthine, M. P. 106–108°
(15) 1.3-di-n-butyl-7-diethylcarbamoyl xanthine, M. P. 96–98°
(16) 1.3-di-n-butyl-7-ethylcarbamoyl xanthine, M. P. 105.5–106.5°
(17) 1.3-di-n-butyl-7-diethylcarbamoyl xanthine, M. P. 53.5–55°
(18) 1-methyl-3-ethyl-7-dimethylcarbamoyl xanthine, M. P. 143–145.5°
(19) 1-methyl-3-ethyl-7-diethylcarbamoyl xanthine, M. P. 100–101.8°
(20) 1-ethyl-3-n-propyl-7-dimethylcarbamoyl xanthine, M. P. 120.5–122°
(21) 1.3-diethyl-7-allylcarbamoyl xanthine, M. P. 101–102.2°
(22) 1.3-diethyl-7-(methyl-ethyl-carbamoyl)-xanthine, M. P. 99.5–101.5°
(23) 1.3-di-n-butyl-7-morpholinocarbonyl xanthine, M. P. 108.5–110.2°
(24) 1.3-di-n-amyl-7-dimethylcarbamoyl xanthine, M. P. 90.5–92°
(25) 1.3-di-isobutyl-7-methylcarbamoyl xanthine, M. P. 128.5–130°
(26) 1.3-di-isobutyl-7-ethylcarbamoyl xanthine, M. P. 114.5–117°
(27) 1.3-di-isobutyl-7-(methyl-ethyl-carbamoyl)-xanthine, M. P. 118.5–120.5°
(28) 1.3-di-isobutyl-7-allylcarbamoyl xanthine, M. P. 135.5–137.5°
(29) 1.3-di-isobutyl-7-morpholinocarbonyl xanthine, M. P. 90.5–93.5°
(30) 1.3-dimethyl-8-ethyl-7-diethylcarbamoyl xanthine, M. P. 89.5–91.5°
(31) 1.3-dimethyl-8-n-propyl-7-dimethylcarbamoyl xanthine, M. P. 108–110.5°
(32) 1.3-diethyl-8-methyl-7-dimethylcarbamoyl xanthine, M. P. 147–149°
(33) 1.3-diethyl-8-ethyl-7-dimethylcarbamoyl xanthine, M. P. 93–95.5°
(34) 1.3-diethyl-8-n-propyl-7-dimethylcarbamoyl xanthine, M. P. 115.5–116.5°
(35) 1.3-diethyl-8-n-propyl-7-diethylcarbamoyl xanthine, M. P. 69–72°
(36) 1.3-di-isobutyl-8-methyl-7-ethylcarbamoyl xanthine, M. P. 121–122°
(37) 1.3-di-isobutyl-8-methyl-7-dimethylcarbamoyl xanthine, M. P. 105–108°
(38) 1.3-di-isobutyl-8-methyl-7-morpholinocarbonyl xanthine, M. P. 132–134°
(39) 1.3-di-isobutyl-8-ethyl-7-dimethylcarbamoyl xanthine, M. P. 76.8–78.5°

What we claim is:

1. Xanthine derivatives corresponding to the formula:

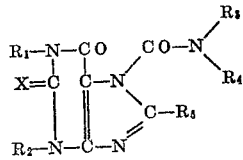

wherein each of $R_1$, $R_2$ and $R_3$ represents a member selected from the group consisting of lower alkyl and allyl, $R_4$ represents a member selected from the group consisting of hydrogen and lower alkyl, $R_3$ and $R_4$ together with the nitrogen atom represent a member selected from the group consisting of an alkylene imino radical with 5 to 6 ring members and the morpholino radical, $R_5$ represents a member selected from the group consisting of hydrogen and lower alkyl, and X represents a member selected from the group consisting of oxygen and sulphur.

2. A xanthine derivative corresponding to the formula:

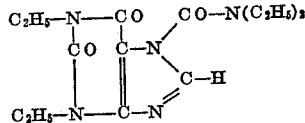

3. A xanthine derivative corresponding to the formula:

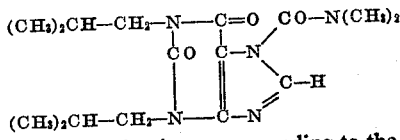

4. A xanthine derivative corresponding to the formula:

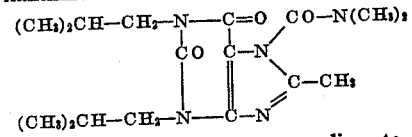

5. A xanthine derivative corresponding to the formula:

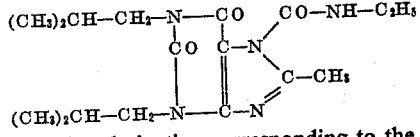

6. A xanthine derivative corresponding to the formula

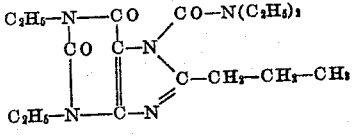

No references cited.